United States Patent
Hill

(10) Patent No.: US 9,575,942 B1
(45) Date of Patent: Feb. 21, 2017

(54) EXPANDED ICON NAVIGATION

(71) Applicant: Amazon Technologies, Inc., Reno, NV (US)

(72) Inventor: Peter Frank Hill, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 247 days.

(21) Appl. No.: 14/080,095

(22) Filed: Nov. 14, 2013

(51) Int. Cl.
| | |
|---|---|
| *G06F 17/00* | (2006.01) |
| *G06F 17/22* | (2006.01) |
| *G06F 17/30* | (2006.01) |
| *G06Q 30/02* | (2012.01) |
| *G06F 3/0483* | (2013.01) |
| *G06F 3/0481* | (2013.01) |
| *G06F 3/0482* | (2013.01) |
| *G06Q 10/10* | (2012.01) |

(52) U.S. Cl.
CPC ..... *G06F 17/2247* (2013.01); *G06F 17/30864* (2013.01); *G06F 3/0481* (2013.01); *G06F 3/0482* (2013.01); *G06F 3/0483* (2013.01); *G06F 17/3089* (2013.01); *G06F 17/30867* (2013.01); *G06F 17/30873* (2013.01); *G06F 17/30884* (2013.01); *G06Q 10/10* (2013.01); *G06Q 30/02* (2013.01)

(58) Field of Classification Search
CPC ............ G06F 17/30864; G06F 17/3089; G06F 17/30876; G06F 17/30867; G06F 17/30884; G06F 17/2245; G06F 17/30873;G06F 17/30905; G06F 17/20873; G06F 3/0481–3/0483; G06F 17/38867; G06Q 11/10; G06Q 30/02; G06Q 9/4443
USPC ................ 715/805–863, 203, 782; 704/4–10
See application file for complete search history.

(56) References Cited

U.S. PATENT DOCUMENTS

| | | | |
|---|---|---|---|
| 6,546,393 B1* | 4/2003 | Khan | ................ G06F 17/30884 |
| 6,631,496 B1* | 10/2003 | Li | ..................... G06F 17/30884 |
| | | | 707/999.01 |
| 2008/0010319 A1* | 1/2008 | Vonarburg | ........ G06F 17/30861 |

* cited by examiner

*Primary Examiner* — Quoc A Tran
(74) *Attorney, Agent, or Firm* — Thomas|Horstemeyer, LLP; Michael J. D'Aurelio; Jason M. Perilla

(57) ABSTRACT

Aspects of expanded icon navigation are described. In one embodiment, one or more marked locations are registered, for example, as bookmarks, during navigation of network pages or files. A hierarchical structure of at least one location associated with the one or more marked locations is indexed to generate a marked zone hierarchy. Further, a collection of accessed locations is assembled according to traced access across the indexed hierarchical structure, network pages, or files. The access across the indexed hierarchical structure, network pages, or files may be traced over a period of time. In other aspects, the one or more marked locations are categorized among the collection of accessed locations to provide an assimilated set of locations, and one or more anchors are established. Further, at least one branch of the one or more anchors is populated.

20 Claims, 7 Drawing Sheets

EXPANDED ICON NAVIGATION

BACKGROUND

Many internet browser applications provide a means for a user to bookmark network pages for quick and easy access or reference at a later time. In this context, a user may be able to quickly refer to a list of saved bookmarks, and select one for quick access to a network page. With the adoption of new types of computing devices, and various sizes of capacitive touch display screens, an arrangement of bookmarks may be displayed in various ways. For example, rather than selecting a bookmark from an ordered list, a bookmark may be selected from an arrangement of icons displayed on a screen.

In the overall context of bookmarks, it is noted that an internet browser application may provide other means to assist users with organizing and highlighting network pages for quick reference. With the adoption of new types of computing devices and cross-computing-platform solutions, however, users may seek and expect additional assistance with the organization of information, including information associated with quick and easy access to network pages.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

Figure 1:
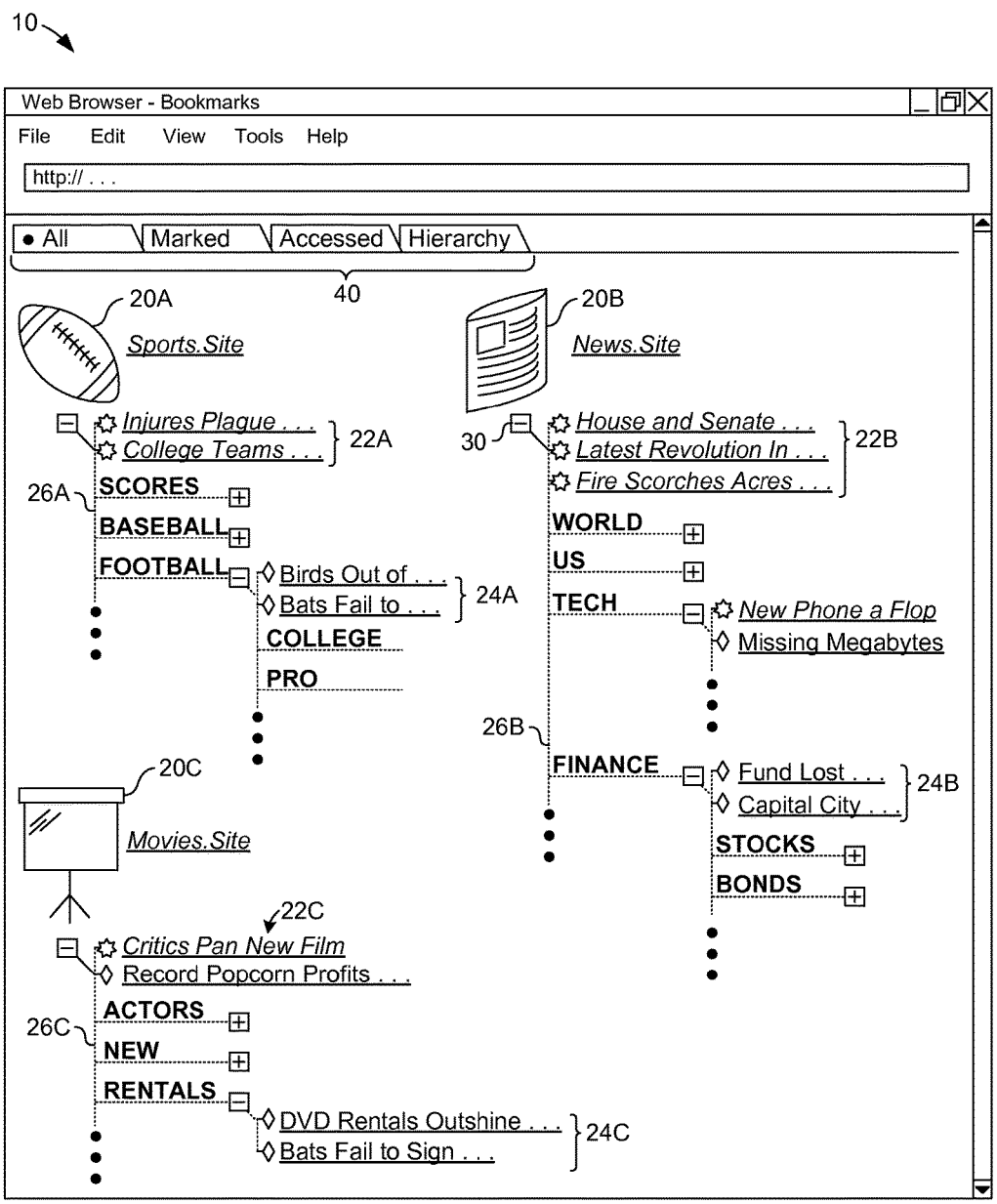
FIG. 1 illustrates an expanded icon navigation display page according to various embodiments of the present disclosure.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions or positions of elements and features may be exaggerated to help visually convey certain principles. In the drawings, similar reference numerals between figures designate like or corresponding, but not necessarily the same, elements.

DETAILED DESCRIPTION

Many internet browser applications provide a means for a user to bookmark network pages for quick and easy access or reference at a later time. In this context, a user may be able to quickly refer to a list of saved bookmarks, and select one for quick access to a network page. With the adoption of new types of computing devices, and various sizes of capacitive touch display screens, an arrangement of bookmarks may be displayed in various ways. For example, rather than selecting a bookmark from an ordered list, a bookmark may be selected from an arrangement of icons displayed on a screen.

In the overall context of bookmarks, it is noted that an internet browser application may provide other means to assist users with organizing and highlighting network pages for quick reference. With the adoption of new types of computing devices and cross-computing-platform solutions, however, users may seek and expect additional assistance with the organization of information, including information associated with quick and easy access to network pages.

For example, a user may wish to review marked (i.e., bookmarked, selected, tagged, etc.) locations (e.g., network pages, web pages, file locations, etc.) in connection with a listing of locations accessed over time in an organized format. Further, the user may wish to review marked locations in the context of an overall hierarchical structure from which the marked locations are accessed. Here, it is noted that a network or web page may be accessed from a particular directory hosted by a website or network location. The overall directory structure of the website may provide key information related to other web pages or files of interest to a user. The user may wish to have a marked location displayed in the overall context of the hierarchical directory structure of the website that hosts the marked location. Additionally, as a user browses or accesses network pages or locations, it may be beneficial for the user to have an organized reference to a history of his or her access. Such a collection of accessed locations may be organized among marked locations, and organized among a hierarchical structure from which the marked and accessed locations are hosted.

In this context, aspects of expanded icon navigation are described. In one embodiment, one or more marked locations are registered, for example, as bookmarks, during navigation of network pages or files. A hierarchical structure of at least one location associated with the one or more marked locations is indexed to generate a marked zone hierarchy. Further, a collection of accessed locations is assembled according to traced access across the indexed hierarchical structure, network pages, or files. The access across the indexed hierarchical structure, network pages, or files may be traced over a period of time. In other aspects, the one or more marked locations are categorized among the collection of accessed locations to provide an assimilated set of locations, and one or more anchors are established. Further, at least one branch of the one or more anchors is populated based on the assimilated set of locations and the marked zone hierarchy, and the anchors and associated branches are provided as a display for a user.

Referring to FIG. 1 for example context, an expanded icon navigation display page 10 according to various embodiments of the present disclosure is illustrated. The display page 10 is representative of a display provided by any suitable browser application, such as an Internet browser, for example. On the display page 10, various anchors 20A, 20B, and 20C (collectively "anchors 20") are illustrated. Each of the anchors 20 is associated with a hierarchy of network pages or files posted by a particular network location. For example, the anchor 20A is associated with the network location or host Sports.Site, the anchor 20B is associated with the network location or host News.Site, and the anchor 20C is associated with the network location or host Movies.Site.

Each of the anchors 20A, 20B, and 20C includes an expandable hierarchy 26A, 26B, and 26C (collectively "hierarchies 26"), respectively, of network locations, pages, or files presented in an organized fashion. Particularly, in one embodiment, the network locations are presented in the context of an overall directory structure hierarchy provided or hosted by each of the Sports.Site, News.Site, and Movies.Site network locations, respectively. As illustrated, one or more ordinate, superordinate, or subordinate branches of the hierarchies 26 may be expanded by the expanders 30, to display various levels of hierarchical structure.

Based on a designated directory structure, for example, of the base network locations associated with the anchors 20, the ordinate, superordinate, and subordinate branches of the hierarchies 26 are provided with respective descriptors, which are illustrated in bold and capital letters in FIG. 1. For example, the hierarchy 26A of the anchor 20A includes the ordinate descriptors "SPORTS", "BASEBALL," and "FOOTBALL," and the subordinate descriptors "COLLEGE" and "PRO" of the ordinate descriptor "FOOTBALL." The anchors 20B and 20C include similar descriptors for any ordinate, superordinate, and subordinate branches of the hierarchies 26B and 26C, respectively. The hierarchical structures of various network locations, and the indexing of hierarchical structures, are discussed in further detail below.

As further illustrated in FIG. 1, the anchor 20A includes marked locations 22A and accessed locations 24A. In general, marked locations 22A may be representative of network locations, pages, or files marked and registered by a user. In this context, the marked locations 22A are particularly designated by a user for registry as locations to be stored for easy reference in the future. Accessed locations 24A, on the other hand, may be representative of network locations, pages, or files accessed over time by a user. These accessed locations may be traced, assembled, and/or stored as a collection of accessed locations. Here, the accessed locations may be representative of locations which were accessed by a user over a period of time, but not particularly designated by the user for registry. According to aspects described herein, both marked and accessed locations are organized together according to or in the context of a framework of hierarchical structures defined by network hosts.

As also illustrated in FIG. 1, the anchor 20B includes marked locations 22B and accessed locations 24B, and the anchor 20C includes marked locations 22C and accessed locations 24C. The marked locations 22B and 22C are similar to the marked locations 22A (collectively "marked locations 22"), but are associated with the anchors 20B and 20C, respectively. Further, the accessed locations 24B and 24C are similar to the accessed locations 24A (collectively "accessed locations 24"), but are associated with the anchors 20B and 20C, respectively.

In general, marked locations 22A may be representative of network locations, pages, or files marked and registered by a user. In this context, the marked locations 22A are particularly designated by a user for registry as locations to be stored for easy reference in the future. Accessed locations 24A, on the other hand, may be representative of network locations, pages, or files accessed over time by a user. These accessed locations may be traced, assembled, and/or stored as a collection of accessed locations. Here, the accessed locations may be representative of locations which were accessed by a user over a period of time, but not particularly designated by the user for registry. According to aspects described herein, both marked and accessed locations are organized together according to or in the context of a framework of hierarchical structures defined by network hosts.

The display page 10 of FIG. 1 also includes selectable display tabs 40. Using the display tabs 40, the marked locations 22 and/or the accessed locations 24 may be omitted from the anchors 20 and the hierarchies 26 of the anchors 20. It should be appreciated here that each of the items listed under the anchors 20 is representative of a network location, page, or file, and by clicking, touching, or selecting any of the items, the network location, page, or file may be quickly accessed by a device, as would be understood in the art.

In the following discussion below, a general description of a system for expanded icon navigation and the generation of the display page 10 is provided, followed by a discussion of the operation of the same.

Figure 2:
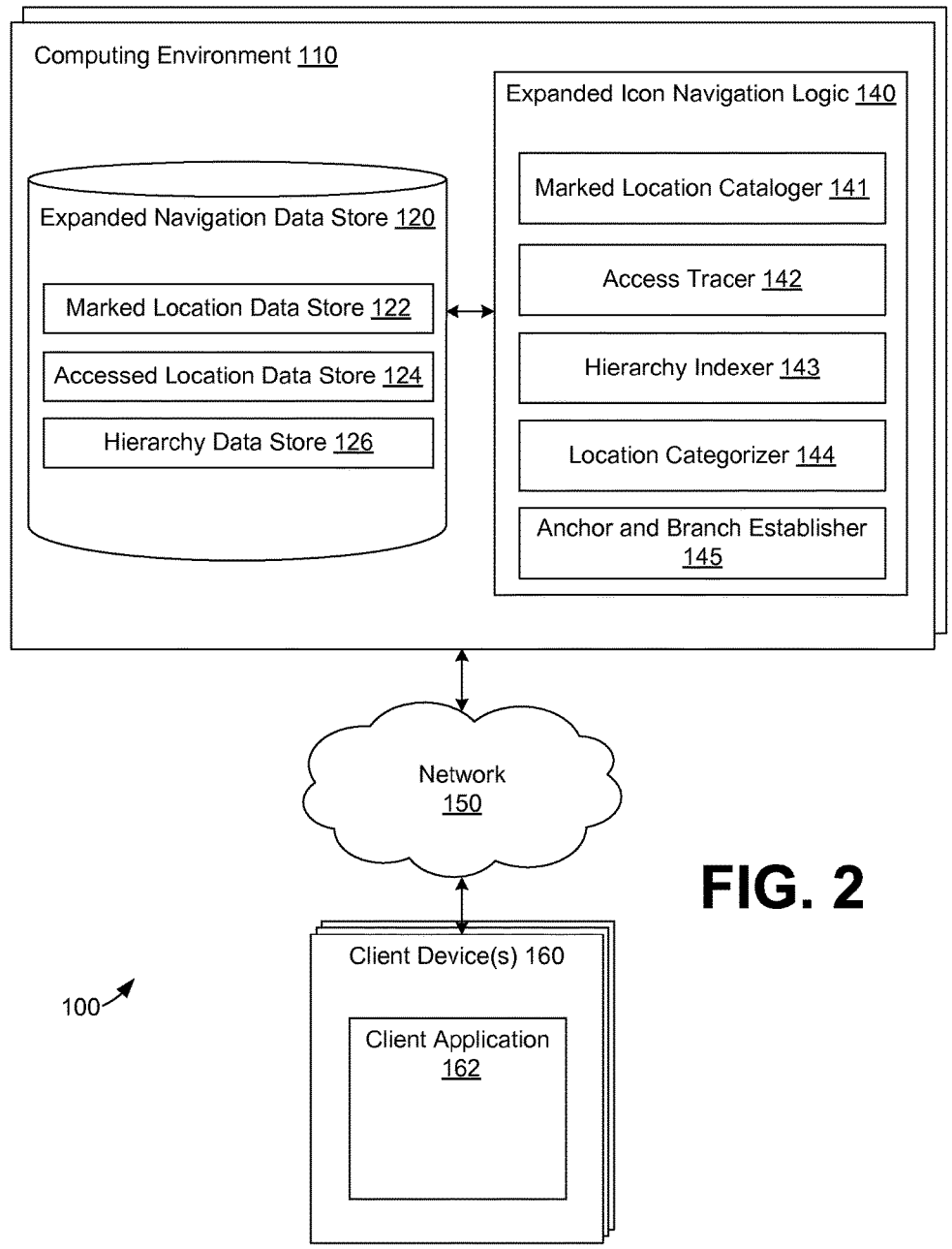
FIG. 2 illustrates a networked environment for expanded icon navigation according to various embodiments of the present disclosure.

FIG. 2 illustrates a networked environment 100 for expanded icon navigation according to various embodiments of the present disclosure. The networked environment 100 includes a computing environment 110, a network 150, and a client device 160.

The computing environment 110 may be embodied as a computer, computing device, or computing system. In certain embodiments, the computing environment 110 may include one or more computing devices arranged, for example, in one or more server or computer banks. The computing device or devices may be located at a single installation site or distributed among different geographical locations. As further described below in connection with FIG. 7, the computing environment 110 may include a plurality of computing devices that together embody a hosted computing resource, a grid computing resource, and/or other distributed computing arrangement. In some cases, the provider computing environment 110 may be embodied as an elastic computing resource where an allotted capacity of processing, network, storage, or other computing-related resources varies over time.

The computing environment 110 may also be embodied, in part, as various functional (e.g., computer-readable instruction) and/or logic (e.g., device, circuit, or processing circuit) elements that may be executed by the computing environment 110 to direct the computing environment 110 to perform aspects of the embodiments described herein. As illustrated in FIG. 2, the computing environment 110 includes an expanded navigation data store 120 and expanded icon navigation logic 140, which are further described below.

In general, the computing environment 110 is configured to register one or more marked network locations, pages, or files, for example, as bookmarks, during navigation of the network locations, pages, or files. The computing environment 110 is further configured to index a hierarchical structure surrounding the network locations, pages, or files, to generate a marked zone hierarchy. The computing environment 110 may also be configured to trace a user's access of network locations, pages, or files over time. The user's access may be traced, in some embodiments, across the hierarchical structure of the marked zone hierarchy. By way of the traced access, the computing environment 110 assembles a collection of accessed locations, as a history of the user's access. The computing environment 110 may be further configured to categorize the one or more marked locations among the collection of accessed locations to provide an assimilated set of locations, and establish one or more anchors. Further, the computing environment 110 may be configured to populate at least one branch of the one or more anchors based on the assimilated set of locations and the marked zone hierarchy.

The network 150 may include the Internet, intranets, extranets, wide area networks (WANs), local area networks (LANs), wired networks, wireless networks, cable networks, satellite networks, other suitable networks, or any combinations thereof. It is noted that the provider computing environment 110 may communicate with the customer client device 160 over various protocols such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), and/or other protocols for communicating data over the network 150, without limitation.

It is noted here that, although not illustrated, the network 150 includes connections to any number of network hosts, such as website servers, file servers, cloud computing resources, databases, data stores, or any other network or computing architectures. In this context, the client device 160 may access any of the computing resources communicatively coupled to the network 150, as would be understood in the art.

The client device 160 is representative of one or a plurality of client devices of one or more users. The client device 160 may be embodied as any processing circuit or processor based device or system, including those embodied in the form of a desktop computer, a laptop computer, a personal digital assistant, a cellular telephone, a set-top box, a music or media player, or a tablet computer, among other example computing devices and systems. The client device 160 may include various peripheral devices, for example. In this context, the peripheral devices may include input devices such as, for example, a keyboard, keypad, touch pad, touch screen, microphone, scanner, mouse, joystick, or one or more push buttons, etc. The peripheral devices may also include a display, indicator lights, speakers, etc., depending upon the primary use of the client device 160.

As illustrated in FIG. 2, the client device 160 may execute applications such as client application 162, which is representative of one application that may be executed on the client device 160. In one embodiment, the client application 162 may be embodied as a browser application that interacts with the computing environment 110 via the network 150. To this end, the client application 162 may be embodied as, for example, an available off-the-shelf hypertext-based internet browser such as INTERNET EXPLORER® sold by Microsoft Corporation of Redmond, Wash., or MOZILLA FIREFOX® which is promulgated by Mozilla Corporation of Mountain View, Calif., another type of browser, or a variant thereof, without limitation. Alternatively, the client application 162 may be embodied as one or more other applications that interact with the computing environment 110 using a suitable protocol via the network 150. Generally, when executed in the client device 160, the client application 162 renders a webpage or similar user interface on a display of the client device 160.

According to certain aspects described herein, the client application 162 operates in concert with the expanded icon navigation logic 140 of the computing environment 110. Particularly, as a user of the client device 160 navigates network locations accessible via the network 150, the expanded icon navigation logic 140 performs certain aspects of the embodiments described herein, such as maintaining a registry of marked locations for the user, indexing hierarchical structures associated with the marked locations for the user, tracing access across the hierarchical structures over time for the user, categorizing the marked locations among accessed locations for the user, establishing anchors, and populating branches of anchors. In this context, the expanded icon navigation logic 140 may store data in the expanded navigation data store 120 which may be accessed by a network browser of any client device for the user, and a display of anchors and associated marked locations, accessed locations, and hierarchical structures associated with the anchors may be displayed for the user on any client device having access to the network 150 and the computing environment 110. In this context, a user may obtain access to his or her particular display of anchors and associated information by providing a username and/or password, as would be understood in the art.

Next, a more detailed description of the operation of the computing environment 110 in the networked environment 100 is provided with reference again to FIG. 2. Here, it may be assumed among various examples described herein that a user of the client device 160 manipulates the client application 162 to browse the network 150 in connection with the computing environment 110.

In various embodiments, the expanded icon navigation logic 140 of the computing environment 110 may facilitate users by arranging network locations, pages, or files in an organized manner according to a hierarchy structure (e.g., directory structure, etc.) associated with network hosts which host the network locations, pages, or files.

In this context, the expanded icon navigation logic 140 may include one or more logic elements that perform or embody various aspects of the features described herein. For example, as illustrated in FIG. 2, the expanded icon navigation logic 140 includes a marked location cataloger 141, an access tracker 142, a hierarchy indexer 143, a location categorizer 144, and an anchor and branch establisher 145.

The marked location cataloger 141 registers one or more marked locations for a user. The marked locations may be registered in the marked location data store 122. That is, for any network location, page, or file marked or designated by a user to be marked for later access, the marked location cataloger 141 stores or registers a mark or bookmark, for example in association with the location, page, or file identified by the user.

The access tracker 142 traces a user's access across network locations, pages, or files accessed via the network 150 over time. The access tracker 142 may trace a user's access across the network 150 generally, or in connection with or in relation to locations marked and registered by the user. In other words, the access tracker 142 may generally trace a user's access across the network 150 (i.e., general access history), or the access tracker 142 may only trace a user's access across network locations, pages, or files associated with locations marked for registry by the user (e.g., access history surrounding marked locations). In some embodiments, after a hierarchical structure surrounding a marked location is identified and indexed by the hierarchy indexer 143, the access tracker 142 may trace a user's access across the hierarchical structure of the marked location. In any case, the access tracker 142 assembles a collection of accessed locations, and stores the collection of accessed locations in the accessed location data store 124.

The hierarchy indexer 143 indexes a hierarchical structure of at least one location associated with one or more marked locations registered by the user, to generate a marked zone hierarchy. In various embodiments, the marked zone hierarchy may include at least one ordinate, superordinate, or subordinate location. In this context, a hierarchy may be identified by the hierarchy indexer 143 based on a directory or file structure relied upon by a network host. For example, with reference to FIG. 1, the marked network location titled "New Phone a Flop" (see anchor 20B, News.Site) would be identified by the hierarchy indexer 143 as being placed at a directory or network location identified as "TECH" for the News.Site network host. At the same time, the hierarchy indexer 143 may identify the directory or network locations "WORLD" and "US" of the News.Site network host. To identify a hierarchical structure, the hierarchy indexer 143 may index or crawl among ordinate, superordinate, and subordinate directory, file, or other organizational structures relied upon by network hosts. These hierarchical structures may be stored by the hierarchy indexer 143 in the hierarchy data store 126.

It is noted here that the hierarchy indexer 143 may index a hierarchical structure of accessed locations in addition to marked locations. That is, the hierarchy indexer 143 may index a directory structure of network hosts which were accessed by a user, to generate an accessed zone hierarchy, although the user may not have marked any network locations, pages, or files for registry. As for the hierarchies 26 illustrated in FIG. 1, the hierarchies 26 may be representative of a combination of marked zone and accessed zone hierarchies, among embodiments.

The location categorizer 144 categorizes one or more marked locations among a collection of accessed locations, to provide an assimilated or combined set of locations. Particularly, the location categorizer 144 categorizes one or more locations marked by the marked location cataloger 141 with locations traced by the access tracker 142, and generates an assimilated or combined set of locations. In general, locations may be assimilated or combined in an organized fashion, for example, based on a base or common network host of the locations.

The anchor and branch establisher 145 establishes marked location anchors associated with one or more marked locations, in preparation for a display of anchors associated with network hosts of marked locations. In certain embodiments, the anchor and branch establisher 145 may establish accessed location anchors associated with one or more accessed locations. The anchor and branch establisher 145 further populates one or more branches of marked or accessed location anchors based on information stored in the expanded navigation data store 120.

For example, for a marked location of a network host, branches of an anchor associated with the marked location may be populated based on hierarchical structures of the network host, as determined by the hierarchy indexer 143 and stored in the hierarchy data store 126. Further, the anchor and branch establisher 145 may organize both marked and accessed locations among the branches of the anchors, based on any assimilated (i.e., combined marked and accessed) locations associated with the network host. In essence, the anchor and branch establisher 145 prepares the organizational structures required for display of the anchors 20, as illustrated in the display 10 in FIG. 1.

Based on the processes of the expanded icon navigation logic 140 described above, the expanded icon navigation logic 140 may display an organized structure of network locations, pages, or files for quick reference by a user. In various embodiments, the display may include a combination of marked and accessed locations, registered and accessed over time, in addition to a hierarchical structure of directories or file structures relied upon by network hosts.

Figure 3:
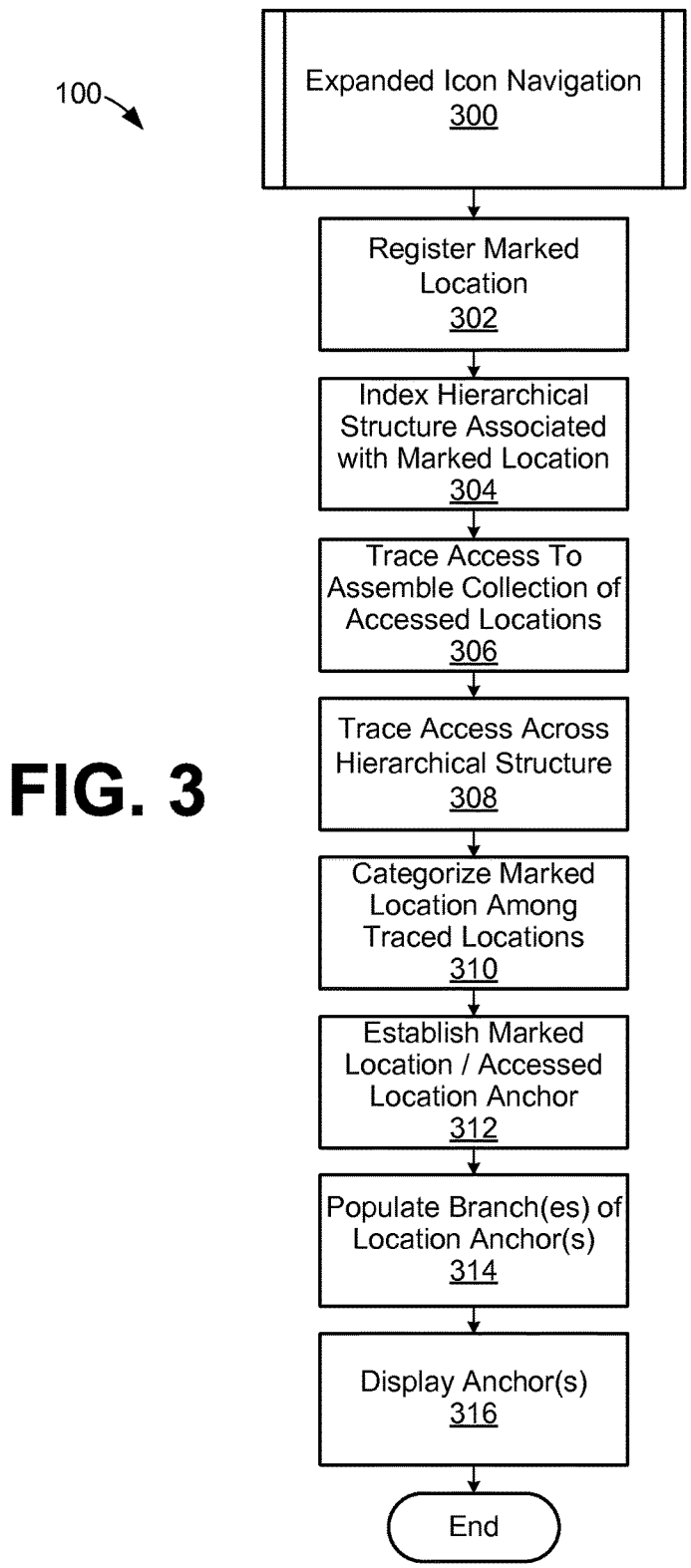
FIG. 3 illustrates an example expanded icon navigation process performed by the computing environment of FIG. 2 according to various embodiments of the present disclosure.

Referring next to FIG. 3, an example expanded icon navigation process performed by the computing environment 110 of FIG. 2 according to various embodiments of the present disclosure is illustrated. It should be appreciated that that the flowchart of FIG. 3 provides merely one example of various functional arrangements that may be employed to implement the operations of the computing environment 110, as described herein. In certain aspects, the flowchart of FIG. 3 may be viewed as depicting an example group of steps performed by the computing environment 110 according to one or more embodiments.

FIG. 3 illustrates an example expanded icon navigation process 300 performed by the computing environment of FIG. 2 according to various embodiments of the present disclosure. Here, it is noted that, although the process 300 is described in connection with the computing environment 110 of FIG. 2, other computing environments may perform the processes illustrated in FIG. 3. It is further noted that, while the process 300 is described in connection with marked, accessed, and traced locations, for example, such locations may be representative of various types of network pages, web pages, file locations, etc.

At reference numeral 302, the process 300 includes registering a marked location. For example, as discussed above in connection with FIG. 2, a user of the client device 160 may mark a network location, page, or file for registry as a marked location, and the marked location cataloger 141 may store data associated with the location as a mark or bookmark in the marked location data store 122.

At reference numeral 304, the process 300 includes indexing a hierarchical structure of at least one location associated with the marked location, to generate a marked zone hierarchy. Here, the hierarchy indexer 143 (FIG. 2) may index a hierarchical structure of the location marked at reference numeral 302, for example, to generate a marked zone hierarchy. Further, the hierarchical structure may be stored in the hierarchy data store 126. In certain embodiments, the marked zone hierarchy may include at least one ordinate, superordinate, or subordinate location.

At reference numeral 306, the process 300 includes tracing a user's access across network locations, pages, or files, over time, to assemble a collection of accessed locations or a general access history. In other words, at reference numeral 306, the process 300 may include tracing a user's access across any location, to assemble a collection of accessed locations. Tracing access at reference numeral 306 may be performed, for example, by the access tracer 142 (FIG. 2), and the collection of accessed locations may be stored in the accessed location data store 124. At reference numeral 308, the process 300 may further include tracing a user's access across the hierarchical structure indexed at reference numeral 304, to assemble a collection of accessed locations surrounding marked locations. Again, tracing access at reference numeral 308 may be performed, for example, by the access tracer 142.

In certain embodiments, the locations accessed at reference numeral 306 and/or 308 may be indexed, to determine or generate an accessed zone hierarchy. For example, the processes performed at reference numeral 304 may be additionally performed in connection with the locations traced at reference numerals 306 and/or 308.

At reference numeral 310, the process 300 includes categorizing the marked location among the collection (or collections) of accessed locations, to provide an assimilated set of locations. For example, the categorizing may be performed by the location categorizer 144 (FIG. 2) and stored at a suitable location in the expanded navigation data store 120, as necessary. It is noted that, at reference numeral 310, the process 300 includes collecting marked and accessed locations together in a single group, generally in association with a single network host, so that the locations may be paired or associated with an anchor for the network host.

At reference numeral 312, the process 300 includes establishing one or more marked location and/or accessed location anchors associated with the one or more marked locations registered at reference numeral 302 and/or the one or more locations traced at reference numerals 306 and/or 308. With reference to FIGS. 1 and 2, for example, the anchors 20 (FIG. 1) may be established by the anchor and branch establisher 145 (FIG. 2). In one embodiment, each anchor is associated with a respective network host, such as the Sports.Site, News.Site, and Movies.Site network hosts illustrated in FIG. 1. While certain icons are illustrated for each of the anchors 20, is noted that the icons in FIG. 1 are merely representative any suitable form of icon or anchor may be relied upon among the embodiments described herein.

At reference numeral 314, the process 300 includes populating at least one branch of the anchors established at reference numeral 312. The population of branches at reference numeral 314 may be based upon the marked zone (or accessed zone) hierarchical structures indexed at reference numeral 304, the locations marked at reference numeral 302, and the accessed locations traced at reference numerals 306 and/or 308, for example. The branches may be populated with titles of network locations, pages, or files accessed, and links or direct or indirect references, for example, to the network locations, pages, or files may be populated among the branches. With reference to FIG. 2 for example context, the anchor and branch establisher 145 may perform the processes at reference numeral 314.

At reference numeral 316, the process 300 includes displaying the anchors established at reference numeral 312 and populated at reference numeral 314. Generally, the expanded icon navigation logic 140 of the computing environment 110 in FIG. 2 may generate a suitable network page to be displayed or rendered on the client device 160, in response to a user's request for a listing of bookmarks, for example. The network page, once rendered, may be similar to the display 10 in FIG. 1, although it is noted that the display may include additional or fewer anchors depending upon the number of network locations marked for registry and the length of history of the user's accessed locations, among other factors.

In other aspects of the embodiments described herein, a display of anchors may be organized in various fashions. For example, at reference numeral 316, the process 300 may include receiving a selection of a composition of a display of anchors, and a display of anchors may be generated accordingly.

Figure 4:
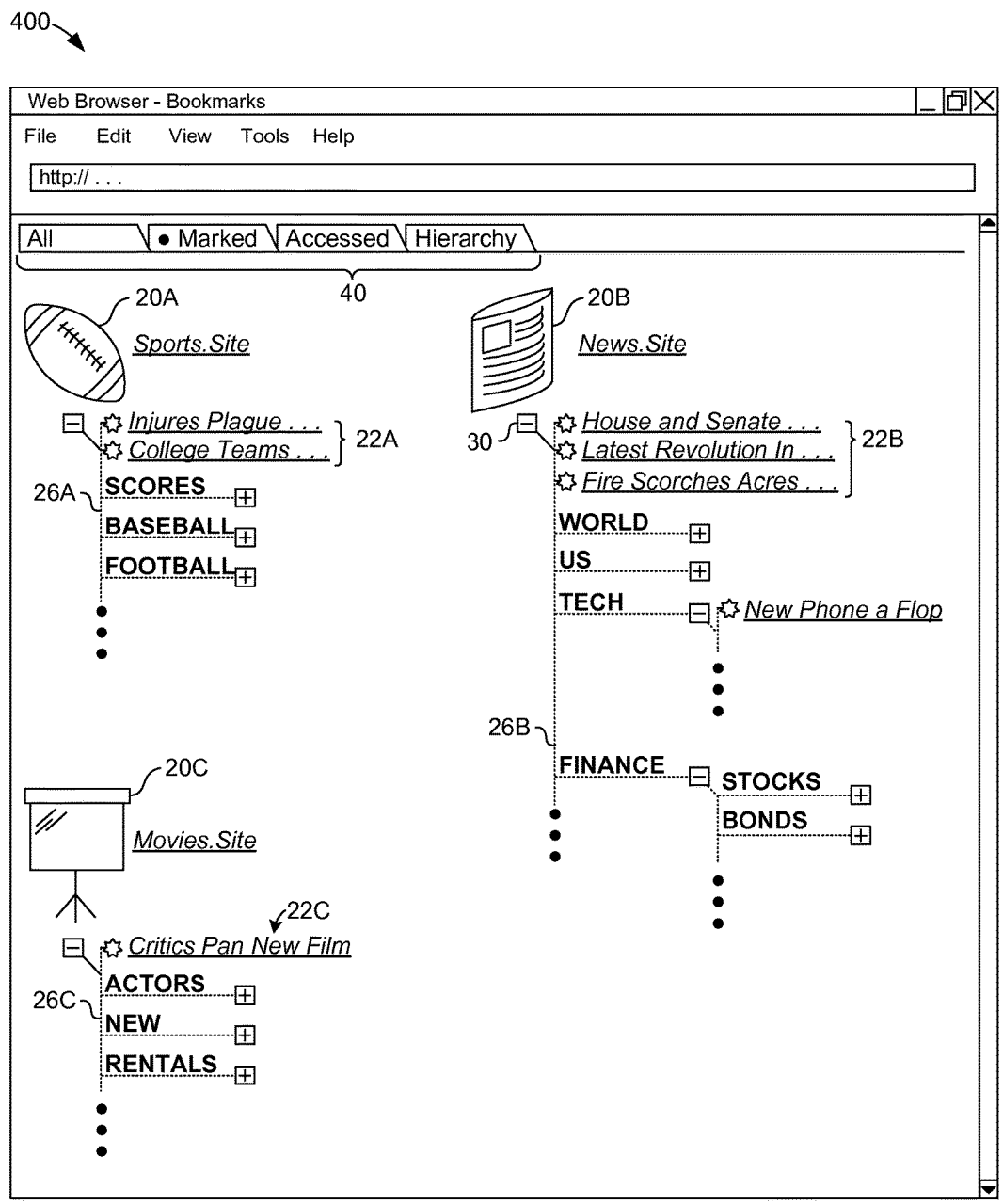
FIG. 4 illustrates a marked location navigation display page generated by the computing environment of FIG. 2 according to aspects of the present disclosure.

With regard to various displays or compositions of displays of anchors, FIG. 4 illustrates a marked location navigation display page 400 generated by the computing environment 110 of FIG. 2 the according to aspects of the present disclosure. In FIG. 4, a selection of the "Marked" tab 40 is received by the computing environment 110. In this case, a display page is generated in which each of the anchors 20 in FIG. 4 includes a display of the marked locations 22 and the hierarchies 26, but omits the accessed locations 24.

Figure 5:
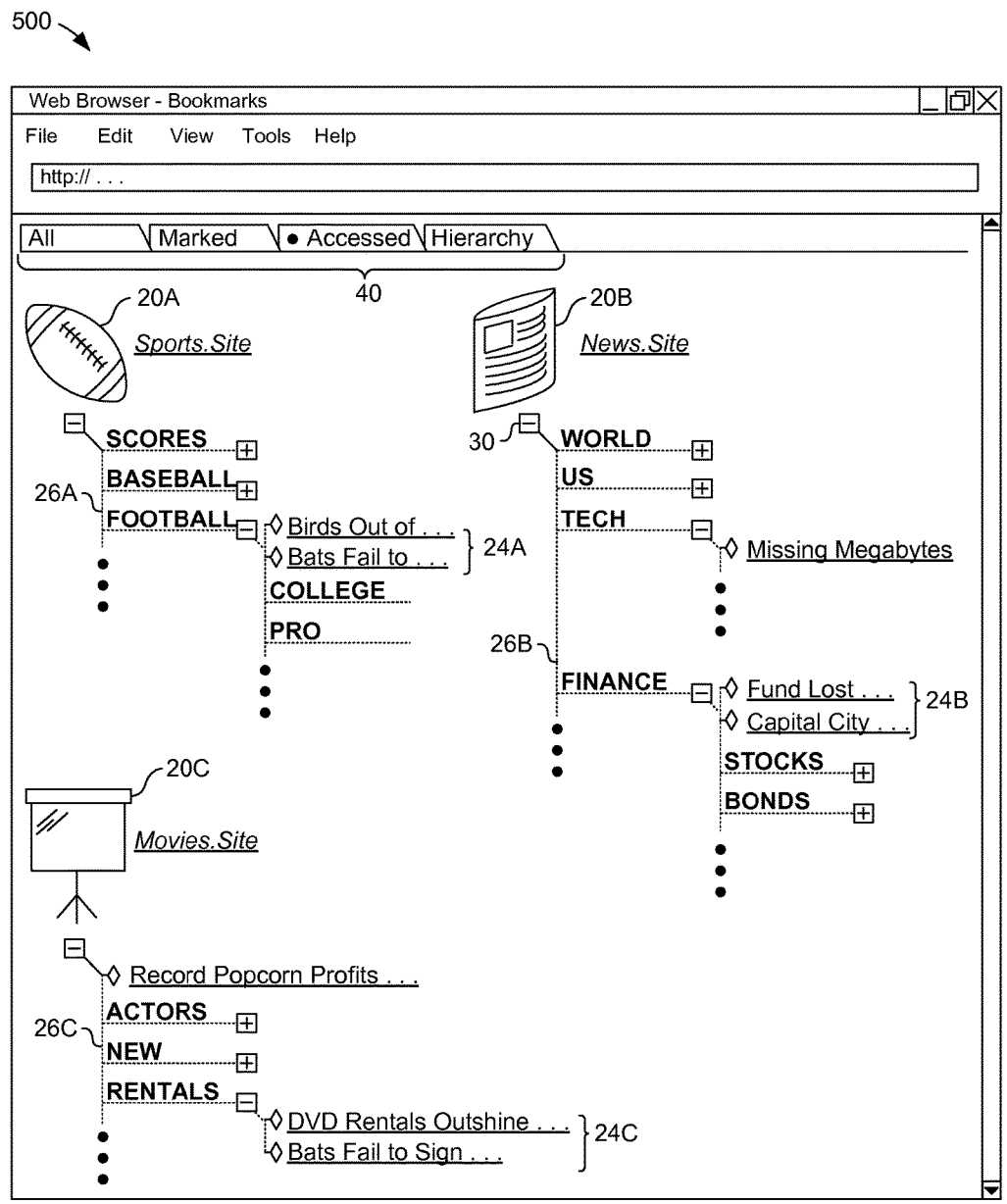
FIG. 5 illustrates an accessed location navigation display page generated by the computing environment of FIG. 2 according to aspects of the present disclosure.
Figure 6:
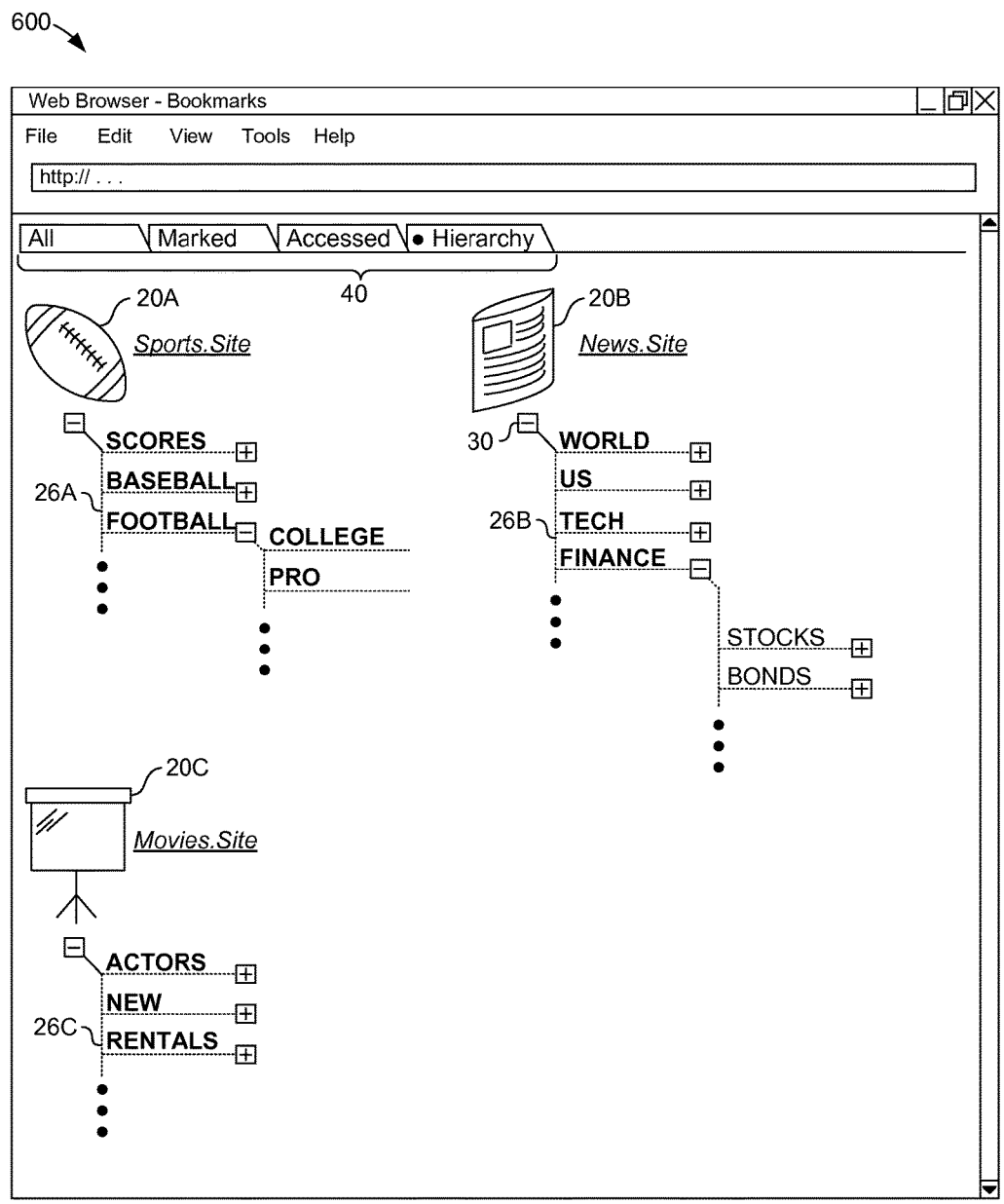
FIG. 6 illustrates a hierarchy navigation display page generated by the computing environment of FIG. 2 according to aspects of the present disclosure.

As another example, FIG. 5 illustrates an accessed location navigation display 500 page generated by the computing environment 110 of FIG. 2 the according to aspects of the present disclosure. In FIG. 5, a selection of the "Accessed" tab 40 is received by the computing environment 110. In this case, a display page is generated in which each of the anchors 20 in FIG. 5 includes a display of the accessed locations 24 and the hierarchies 26, but omits the marked locations 22. Finally, FIG. 6 illustrates a hierarchy navigation display page 600 generated by the computing environment 110 of FIG. 2 the according to aspects of the present disclosure. In FIG. 6, a selection of the "Hierarchy" tab 40 is received by the computing environment 110. In this case, a display page is generated in which each of the anchors 20 in FIG. 6 includes a display of the hierarchies 26, but omits the marked locations 22 and the accessed locations 24.

According to the example displays 10, 400, 500, and 600 of FIGS. 1 and 4-6, respectively, it should be appreciated that the organization of branches and populated titles of anchors may be varied, depending upon the information desired by a user. In general, according to the features of the embodiments described herein, various network locations, pages, and files may be organized in a hierarchical structure or easy reference at a later time. With reference to the organization provided by the anchors, a user may quickly access network locations, pages, or files.

Figure 7:
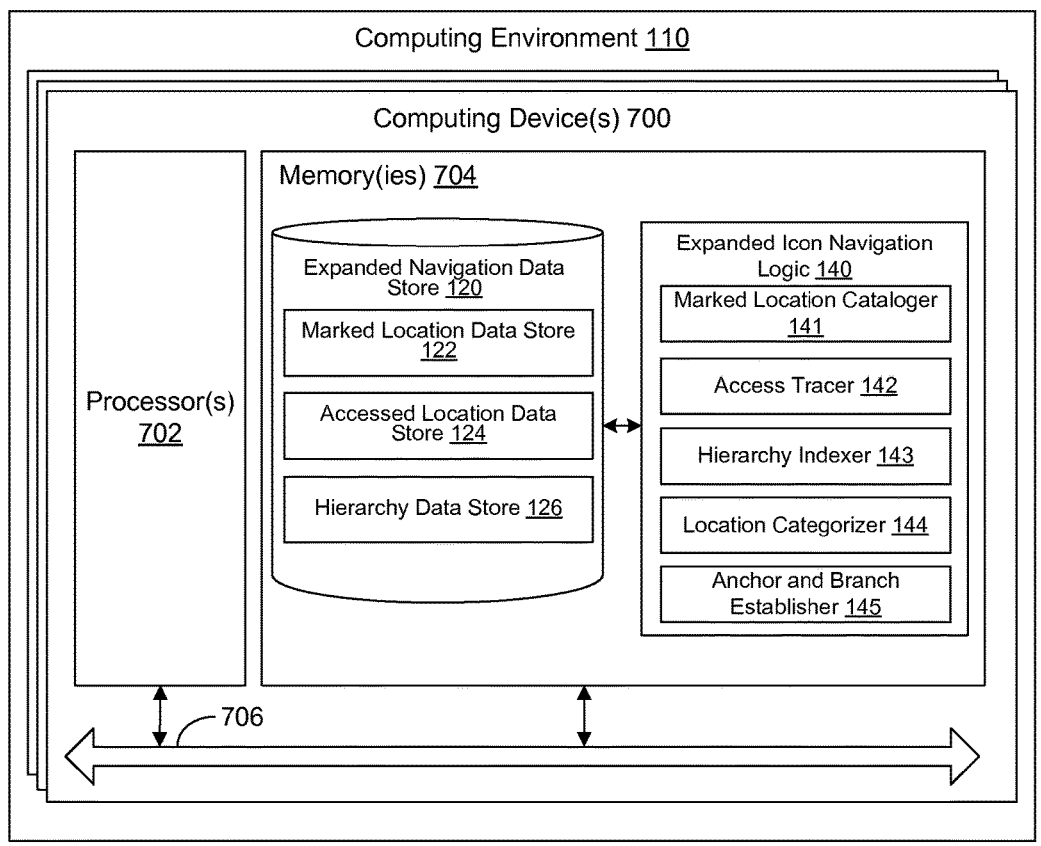
FIG. 7 illustrates an example schematic block diagram of the computing environment employed in the networked environment of FIG. 2 according to various embodiments of the present disclosure.

FIG. 7 illustrates an example schematic block diagram of the computing environment 100 employed in the networked environment of FIG. 2 according to various embodiments of the present disclosure. The computing environment 110 includes one or more computing devices 700. Each computing device 700 includes at least one processing system, for example, having a processor 702 and a memory 704, both of which are electrically and communicatively coupled to a local interface 706. To this end, each computing device 700 may be embodied as, for example, at least one server computer or similar device. The local interface 706 may be embodied as, for example, a data bus with an accompanying address/control bus or other bus structure as can be appreciated.

In various embodiments, the memory 704 stores data and software or executable-code components executable by the processor 702. For example, the memory 704 may store executable-code components associated with expanded icon navigation 140, for execution by the processor 702. The memory 704 may also store data such as that stored in the expanded navigation data store 120, among other data.

It should be understood and appreciated that the memory 704 may store other executable-code components for execution by the processor 702. For example, an operating system may be stored in the memory 704 for execution by the processor 702. Where any component discussed herein is implemented in the form of software, any one of a number of programming languages may be employed such as, for example, C, C++, C#, Objective C, JAVA®, JAVASCRIPT®, Perl, PHP, VISUAL BASIC®, PYTHON®, RUBY, FLASH®, or other programming languages.

As discussed above, in various embodiments, the memory 704 stores software for execution by the processor 702. In this respect, the terms "executable" or "for execution" refer to software forms that can ultimately be run or executed by the processor 702, whether in source, object, machine, or other form. Examples of executable programs include, for example, a compiled program that can be translated into a machine code format and loaded into a random access portion of the memory 704 and executed by the processor 702, source code that can be expressed in an object code format and loaded into a random access portion of the memory 704 and executed by the processor 702, or source code that can be interpreted by another executable program to generate instructions in a random access portion of the memory 704 and executed by the processor 702, etc. An executable program may be stored in any portion or component of the memory 704 including, for example, a random access memory (RAM), read-only memory (ROM), magnetic or other hard disk drive, solid-state, semiconductor, or similar drive, universal serial bus (USB) flash drive, memory card, optical disc (e.g., compact disc (CD) or digital versatile disc (DVD)), floppy disk, magnetic tape, or other memory component.

In various embodiments, the memory 704 may include both volatile and nonvolatile memory and data storage components. Volatile components are those that do not retain data values upon loss of power. Nonvolatile components are those that retain data upon a loss of power. Thus, the memory 704 may include, for example, a RAM, ROM, magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM may include, for example, a static random access memory (SRAM), dynamic random access memory (DRAM), or magnetic random access memory (MRAM), and/or other similar memory device. The ROM may include, for example, a programmable read-only memory (PROM), erasable programmable read-only memory (EPROM), electrically erasable programmable read-only memory (EEPROM), or other similar memory device.

Also, the processor 702 may represent multiple processors 702 and/or multiple processor cores and the memory 704 may represent multiple memories that operate in parallel, respectively, or in combination. Thus, the local interface 706 may be an appropriate network or bus that facilitates communication between any two of the multiple processors 702, between any processor 702 and any of the memories 704, or between any two of the memories 704, etc. The local interface 706 may include additional systems designed to coordinate this communication, including, for example, a load balancer that performs load balancing. The processor 702 may be of electrical or of some other available construction.

As discussed above, the expanded icon navigation logic 140 may be embodied, in part, by software or executable-code components for execution by general purpose hardware. Alternatively the same may be embodied in dedicated hardware or a combination of software, general, specific, and/or dedicated purpose hardware. If embodied in such hardware, each can be implemented as a circuit or state machine, for example, that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart or process diagram of FIG. 3 is representative of certain processes, functionality, and operations of embodiments discussed herein. Each block may represent one or a combination of steps or executions in a process. Alternatively or additionally, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as the processor 702. The machine code may be converted from the source code, etc. Further, each block may represent, or be connected with, a circuit or a number of interconnected circuits to implement a certain logical function or process step.

Although the flowchart or process diagram of FIG. 3. illustrates a specific order, it is understood that the order may differ from that which is depicted. For example, an order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the expanded icon navigation logic 140 that are embodied, at least in part, by software or executable-code components, may be embodied or stored in any tangible or non-transitory computer-readable medium or device for execution by an instruction execution system such as a general purpose processor. In this sense, the logic may be embodied as, for example, software or executable-code components that can be fetched from the computer-readable medium and executed by the instruction execution system. Thus, the instruction execution system may be directed by execution of the instructions to perform certain processes such as those illustrated in FIG. 3. In the context of the present disclosure, a "computer-readable medium" can be any tangible medium that can contain, store, or maintain any logic, application, software, or executable-code component described herein for use by or in connection with an instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium may include a RAM including, for example, an SRAM, DRAM, or MRAM. In addition, the computer-readable medium may include a ROM, a PROM, an EPROM, an EEPROM, or other similar memory device.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, at least the following is claimed:

1. A non-transitory computer-readable medium embodying a program that, when executed by at least one computing device, directs the at least one computing device to perform a method, comprising:
registering, by the at least one computing device, a marked web page hosted at a network site;
indexing, by the at least one computing device, a hierarchical structure of the network site associated with the marked web page to generate a marked zone hierarchy of the network site, the marked zone hierarchy including at least one ordinate, superordinate, or subordinate location hosted by the network site;
tracing, by the at least one computing device, access across the marked zone hierarchy of the network site to assemble a collection of accessed web pages in the network site;
categorizing, by the at least one computing device, the marked web page hosted at the network site among the collection of accessed web pages in the network site to provide an assimilated set of web pages of the network site;
establishing, by the at least one computing device, a marked web page anchor for the network site associated with the marked web page hosted at the network site;
populating, by the at least one computing device, at least one branch of the marked web page anchor for the network site based at least in part on the assimilated set of web pages of the network site and the marked zone hierarchy of the network site; and
providing, by the at least one computing device, a descriptor for the at least one branch of the marked web page anchor based at least in part on a directory structure of the marked zone hierarchy of the network site.

2. The non-transitory computer-readable medium of claim 1, wherein the method further comprises indexing, by the at least one computing device, a hierarchical structure of the collection of accessed web pages in the network site to generate an accessed zone hierarchy of the network site, the accessed zone hierarchy of the network site including at least one ordinate, superordinate, or subordinate location.

3. The non-transitory computer-readable medium of claim 2, wherein the method further comprises establishing, by the at least one computing device, at least one accessed web page anchor associated with the collection of accessed web pages in the network site.

4. The non-transitory computer-readable medium of claim 3, wherein the method further comprises populating, by the at least one computing device, at least one branch of the at least one accessed web page anchor based at least in part on the assimilated set of web pages of the network site and the accessed zone hierarchy of the network site.

5. A system, comprising:
a memory to store computer-readable instructions; and
at least one computing device coupled to the memory and configured, through execution of the computer-readable instructions, to:
register a marked location;
index a hierarchical structure of at least one network location associated with the marked location to generate a marked zone hierarchy;
trace access across the marked zone hierarchy to assemble a collection of accessed locations;
categorize the marked location among the collection of accessed locations to provide an assimilated set of locations;
establish a marked location anchor associated with the marked location;
populate at least one branch of the marked location anchor based at least in part on the marked location and the marked zone hierarchy; and
provide a descriptor for the at least one branch of the marked location anchor based at least in part on a directory structure of the marked zone hierarchy.

6. The system of claim 5, wherein the at least one computing device is further configured to populate at least one other branch of the marked location anchor based at least in part on the assimilated set of locations.

7. The system of claim 5, wherein the at least one computing device is further configured to index a hierarchical structure of the collection of accessed locations to generate an accessed zone hierarchy.

8. The system of claim 7, wherein the at least one computing device is further configured to establish at least one accessed location anchor associated with the collection of accessed locations.

9. The system of claim 8, wherein the at least one computing device is further configured to populate at least one branch of the at least one accessed location anchor based at least in part on the accessed locations and the accessed zone hierarchy.

10. The system of claim 9, wherein the at least one branch of the at least one accessed location anchor comprises at least one ordinate, superordinate, or subordinate branch of the accessed location anchor.

11. The system of claim 5, wherein:
the marked zone hierarchy includes at least one ordinate, superordinate, or subordinate location; and
the at least one branch of the marked location anchor comprises at least one ordinate, superordinate, or subordinate branch of the marked location anchor.

12. A method, comprising:
registering, by one or more computing devices, a marked location;
indexing, by at least one of the one or more computing devices, a hierarchical structure of the at least one network location associated with the marked location to generate a marked zone hierarchy;
tracing, by at least one of the one or more computing devices, access across the marked zone hierarchy to assemble a collection of accessed locations;
categorizing, by at least one of the one or more computing devices, the marked location among the collection of accessed locations to provide an assimilated set of locations
establishing, by at least one of the one or more computing devices, a marked location anchor associated with the marked location; and
providing, by at least one of the one or more computing devices, a descriptor for at least one branch of the marked location anchor based at least in part on a directory structure of the marked zone hierarchy.

13. The method of claim 12, further comprising populating, by at least one of the one or more computing devices, the at least one branch of the marked location anchor based at least in part on the assimilated set of locations and the marked zone hierarchy.

14. The method of claim 13, wherein:
   the marked zone hierarchy includes at least one ordinate, superordinate, or subordinate location; and
   the at least one branch of the marked location anchor comprises at least one ordinate, superordinate, or subordinate branch of the marked location anchor.

15. The method of claim 13, further comprising displaying, by at least one of the one or more computing devices, the marked location anchor and the at least one branch of the marked location anchor.

16. The method of claim 15, further comprising receiving, by at least one of the one or more computing devices, a selection of a composition of a display of anchors.

17. The method of claim 12, further comprising indexing, by at least one of the one or more computing devices, a hierarchical structure of the collection of accessed locations to generate an accessed zone hierarchy.

18. The method of claim 17, further comprising establishing, by at least one of the one or more computing devices, at least one accessed location anchor associated with the collection of accessed locations.

19. The method of claim 18, further comprising populating, by at least one of the one or more computing devices, at least one branch of the at least one accessed location anchor based at least in part on the assimilated set of locations and the accessed zone hierarchy.

20. The method of claim 19, wherein:
   the accessed zone hierarchy includes at least one ordinate, superordinate, or subordinate location; and
   the at least one branch of the accessed location anchor comprises at least one ordinate, superordinate, or subordinate branch of the accessed location anchor.

* * * * *